(12) United States Patent
Zhao et al.

(10) Patent No.: US 10,140,544 B1
(45) Date of Patent: Nov. 27, 2018

(54) ENHANCED CONVOLUTIONAL NEURAL NETWORK FOR IMAGE SEGMENTATION

(71) Applicant: 12 Sigma Technologies, San Diego, CA (US)

(72) Inventors: Tianyi Zhao, Rolla, MO (US); Jiao Wang, San Diego, CA (US); Dashan Gao, San Diego, CA (US); Yunqiang Chen, San Diego, CA (US)

(73) Assignee: 12 Sigma Technologies, San Diego, CA (US)

( * ) Notice: Subject to any disclaimer, the term of this patent is extended or adjusted under 35 U.S.C. 154(b) by 0 days.

(21) Appl. No.: 15/943,392

(22) Filed: Apr. 2, 2018

(51) Int. Cl.
| | |
|---|---|
| *G06K 9/66* | (2006.01) |
| *G06K 9/46* | (2006.01) |
| *G06T 7/11* | (2017.01) |
| *G06T 7/143* | (2017.01) |
| *G06F 15/18* | (2006.01) |
| *G06N 3/04* | (2006.01) |
| *G06N 5/04* | (2006.01) |

(52) U.S. Cl.
CPC .......... *G06K 9/4628* (2013.01); *G06F 15/18* (2013.01); *G06K 9/66* (2013.01); *G06N 3/0454* (2013.01); *G06N 5/046* (2013.01); *G06T 7/11* (2017.01); *G06T 7/143* (2017.01)

(58) Field of Classification Search
CPC ........ G06K 9/4628; G06K 9/66; G06N 5/046; G06N 3/0454; G06T 7/143; G06T 7/11; G06F 15/18
See application file for complete search history.

(56) References Cited

U.S. PATENT DOCUMENTS

| | | | | |
|---|---|---|---|---|
| 8,341,100 | B2 * | 12/2012 | Miller | .............. G06K 9/0014 706/15 |
| 2017/0109625 | A1 * | 4/2017 | Dai | ........................ G06N 3/08 |

OTHER PUBLICATIONS

Mansoor, et al., "Segmentation and Image Analysis of Abnormal Lungs at CT: Current Approaches, Challenges, and Future Trends[1] ," *RadioGraphics*, 35:4, pp. 1056-1076 (2015) Published online 10.1148/rg.2015140232.
Van Rikxoort et al., "Automatic lung segmentation from thoracic computed tomography scans using a hybrid approach with error detection," *Medical Physics*, 36:7, pp. 2934-2947 (2009).
(Continued)

*Primary Examiner* — Siamak Harandi
(74) *Attorney, Agent, or Firm* — Brinks Gilson & Lione

(57) ABSTRACT

This disclosure relates to digital image segmentation and region of interest identification. A computer implemented image segmentation method and system are particularly disclosed, including a predictive model trained based on a deep fully convolutional neural network. The model is trained using a loss function in at least one intermediate layer in addition to a loss function at the final stage of the full convolutional neural network. The predictive segmentation model trained in such a manner requires less training parameters and facilitates quicker and more accurate identification of relevant local and global features in the input image. In one implementation, the fully convolutional neural network is further supplemented with a conditional adversarial neural networks iteratively trained with the fully convolutional neural network as a discriminator measuring the quality of the predictive model generated by the fully convolutional neural network.

20 Claims, 7 Drawing Sheets

(56) References Cited

OTHER PUBLICATIONS

Dai et al., "A novel approach of lung segmentation on chest CT images using graph cuts," *Neurocomputing*, vol. 168, pp. 799-807 (2015).
Birkbeck et al., "Lung Segmentation from CT with Severe Pathologies Using Anatomical Constraints," *Imaging & Computer Vision*, Siemens Corporate Technology, pp. 804-811, (2014) Princeton, NJ.
Shelhamer et al., "Fully convolutional networks for semantic segmentation," *IEEE Trans. Pattern Anal. Mach. Intell.*, 39:4, pp. 640-651 (2017) UC Berkeley, CA.
Ronneberger et al., "U-net: Convolutional networks for Biomedical Image Segmentation," University of Freiburg, Germany; ronneber@infomatik.uni-freiburg.de, WWW home page: http://lmb.informatik.uni-freiburg.de/ pp. 1-8 (2015).
Cicke et al., 3D U-Net: Learning Dense Volumetric Segmentation from Sparse Annotation, in *International Conference on Medical Image Computing and Computer-Assisted Intervention*, pp. 424-432 (2016).
Milletari et al., "V-net: Fully convolutional neural networks for volumetric medical image segmentation," in *3D Vision (3DV), 2016 Fourth International Conference on*. IEEE, pp. 565-571 (2016).
Chen et al., "VoxResNet: Deep Voxelwise Residual Networks for Volumetric Brain Segmentation" *CoRR*, vol. abs/1608.05895, 2016.
Akkus et al., "Deep Learning for Brain MRI Segmentation: State of the Art and Future Directions," *Journal of Digital Imaging*, 30:4, pp. 449-459, (Aug. 2017).
Harrison et al., "Progressive and Multi-Path Holistically Nested Neural Networks for Pathological Lung Segmentation from CT Images," in *Medical Image Computing and Computer-Assisted Intervention (MICCAI)*, 2017.
Wu et al., "Deep Multiple Instance Learning for Image Classification and Auto-Annotation," in *Proceedings of the IEEE Conference on Computer Vision and Pattern Recognition*, pp. 3460-3469 (2015).
Isola et al., "Image-to-Image Translation with Conditional Adversarial Networks," *CoRR*, vol. abs/1611.07004, (2016).
Goodfellow et al., "Generative adversarial nets," in *Advances in Neural Information Processing Systems 27*, pp. 2672-2680. 2014.
Armato III et al., "The Lung Image Database Consortium „LIDC . . . and Image Database Resource Initiative „IDRI: A Completed Reference Database of Lung Nodules on CT Scans," *Medical Physics*, vol. 38:2, pp. 915-931 (Feb. 2011).
Cid et al., Overview of the ImageCLEF 2017 Tuberculosis Task | Predicting Tuberculosis Type and Drug Resistances, in *CLEF 2017 Working Notes*, Dublin, Ireland, Sep. 11-14, 2017, CEUR Workshop Proceedings.
Cid et al., "Efficient and fully automatic segmentation of the lungs in CT volumes," in *Proceedings of the VISCERAL Anatomy Grand Challenge at the 2015 IEEE ISBI*, May 2015, CEUR Workshop Proceedings, pp. 31-35.
Depeursinge et al., "Building a reference multimedia database for interstitial lung diseases," *Computerized Medical Imaging and Graphics*, 36:3, pp. 227-238 (2012).

\* cited by examiner

ENHANCED CONVOLUTIONAL NEURAL NETWORK FOR IMAGE SEGMENTATION

TECHNICAL FIELD

This disclosure relates generally to computer segmentation of digital images and particularly to image segmentation based on convolutional neural networks.

BACKGROUND

A digital image may contain one or more regions of interest (ROIs). In many applications, only image data contained within the one or more ROIs of a digital image may need to be retained for further processing and for information extraction by computers. Efficient and accurate identification of these ROIs thus constitutes a critical first step in these applications, particularly for applications that handle high-volume and/or real-time digital images. Each ROI of a digital image may contain pixels forming patches with drastic variation in texture and pattern, making accurate and efficient identification of the boundary between these ROIs and the rest of the digital image a challenging task for a computer.

SUMMARY

This disclosure is directed to an enhanced convolutional neural network trained using an intermediate loss function in addition to an end state loss function for more accurate and efficient segmentation of digital images.

In one implementation, a computer platform for digital image segmentation is disclosed. The computer image segmentation platform includes a communication interface circuitry, a database, a predictive model repository, and a processing circuitry in communication with the database and the predictive model repository. The processing circuitry is configured to receive a set of training images labeled with a corresponding set of ground truth segmentation masks. The processing circuitry is also configured to establish a fully convolutional neural network comprising a multi-layer contraction convolutional neural network and an expansion convolutional neural network connected in tandem. The processing circuitry is further configured to iteratively train the full convolution neural network in an end-to-end manner using the set of training images and the corresponding set of ground truth segmentation masks by forward-propagating a training image from the set of training images through the fully convolutional neural network to generate a predictive segmentation mask for the training image, generating an end loss based on a difference between the predictive segmentation mask and a ground truth segmentation mask corresponding to the training image, generating an intermediate loss at one of multiple intermediate layers of the multi-layer contraction convolutional neural network based on an intermediate ground truth segmentation mask downsized from a ground truth segmentation mask corresponding to the training image, back-propagating the end loss and the intermediate loss through the full convolutional neural network, and minimizing a sum of the end loss and the intermediate loss by adjusting a set of training parameters of the fully convolutional neural network using gradient descent.

In the computer image segmentation platform above, the processing circuitry may be configured to, at one of the intermediate layers of the multi-layer contraction convolutional neural network, perform convolution of a set of intermediate features sliding through an input from a preceding layer of the multi-layer contraction convolutional neural network to generate a set of feature maps, perform a max pooling within each map to obtain a contracted set of feature maps, and output the contracted set of feature maps to a next layer of the multi-layer contraction convolutional neural network.

In the computer image segmentation platform above, the processing circuitry may be further configured to, at the one of the intermediate layers of the multi-layer contraction convolutional neural network, zero-pad each of the set of feature maps to a same size as a size of the input from the preceding layer.

In the computer image segmentation platform above, the intermediate loss may be generated at the one of the intermediate layers of the multi-layer contraction convolutional neural network.

In the computer image segmentation platform above, each of the set of ground truth segmentation masks may be a binary mask. The intermediate loss may include a first portion and a second portion. The first portion may be derived from max pooling among the set of feature maps generated at the one of the intermediate layers over a portion of the set of feature maps determined by a positive portion of a ground truth segmentation mask corresponding to the training image. The second portion may be derived from average pooling among the set of feature maps generated at the one of the intermediate layers over a portion of the set of feature maps determined by a negative portion of the ground truth segmentation mask corresponding to the training image.

In the computer image segmentation platform above, a feature map generated by max pooling the set of feature maps generated at the one of the intermediate layers and a feature map generated by average pooling the set of feature maps generated at the one of the intermediate layers may be forwarded to a next layer of the one of the intermediate layers of the contraction convolutional neural network.

In the computer image segmentation platform above, the expansion convolutional neural network may include multiple layers corresponding to the multi-layer contraction convolutional neural network.

In the computer image segmentation platform above, the expansion convolutional neural network may be interconnected with the multi-layer contraction convolutional neural network at each layer by receiving feature maps from the multi-layer contraction convolutional neural network.

In the computer image segmentation platform above, the feature maps received from the multi-layer contraction convolutional neural network may be concatenated with corresponding feature maps in the expansion convolutional neural network.

In the computer image segmentation platform above, each of the set of ground truth segmentation masks may be a binary mask.

In the computer image segmentation platform above, each of the set of ground truth segmentation masks may be a multi-value mask.

In the computer image segmentation platform above, the multi-layer contraction convolutional neural network may include four convolution layers.

In the computer image segmentation platform above, the processing circuitry may be further configured to interactively train the fully convolutional neural network based on an output of a discriminator designed for classifying the set of ground truth segmentation masks and segmentation masks predicted by the full convolutional neural network.

In the computer image segmentation platform above, the processing circuitry is further configured to iteratively train the fully convolutional neural network based on an output of a discriminator designed for classifying the set of ground truth segmentation masks augmented by corresponding images and segmentation masks predicted by the full convolutional neural network and augmented by images corresponding to the predicted segmentation masks.

In the computer image segmentation platform above, the discriminator may include a multi-layer convolutional neural network.

In the computer image segmentation platform above, the processing circuitry may be further configured to receive an unlabeled image, forward-propagate the unlabeled image through the fully convolutional neural network to generate an output segmentation mask, filter the unlabeled image using the output segmentation mask to only retain portion of image data for the unlabeled image, and further process the unlabeled image based on the retained portion of the image data.

In one implementation, a method for image segmentation by a computer containing at least one processor is disclosed. The method includes receiving a set of training images labeled with a corresponding set of ground truth segmentation masks, and establishing a fully convolutional neural network comprising a multi-layer contraction convolutional neural network and an expansion convolutional neural network connected in tandem. The method further includes iteratively training the fully convolutional neural network in an end-to-end manner using the set of training images and the corresponding set of ground truth segmentation masks by forward-propagating a training image from the set of training images through the fully convolutional neural network to generate a predictive segmentation mask for the training image, generating an end loss based on a difference between the predictive segmentation mask and a ground truth segmentation mask corresponding to the training image, generating an intermediate loss at one of multiple intermediate layers of the multi-layer contraction convolutional neural network based on an intermediate ground truth segmentation mask downsized from a ground truth segmentation mask corresponding to the training image, back-propagating the end loss and the intermediate loss through the full convolutional neural network, and minimizing a sum of the end loss and the intermediate loss by adjusting a set of training parameters of the fully convolutional neural network using gradient descent.

In one implementation, the method above may further include, at one of the intermediate layers of the multi-layer contraction convolutional neural network, performing convolution of a set of intermediate features sliding through an input from a preceding layer of the multi-layer contraction convolutional neural network to generate a set of feature maps, performing a max pooling within each map to obtain a contracted set of feature maps, and outputting the contracted set of feature maps to a next layer of the multi-layer contraction convolutional neural network.

The method above may further include, at the one of the intermediate layers of the multi-layer contraction convolutional neural network, zero padding each of the set of feature maps to a same size as size of the input from the preceding layer.

In the method above, the intermediate loss may be generated at the one of the intermediate layers of the multi-layer contraction convolutional neural network.

In the method above, each of the set of ground truth segmentation masks may be a binary mask. The intermediate loss may include a first portion and a second portion. The first portion may be derived from max pooling among the set of feature maps generated at the one of the intermediate layers over a portion of the set of feature maps determined by a positive portion of a ground truth segmentation mask corresponding to the training image. The second portion may be derived from average pooling among the set of feature maps generated at the one of the intermediate layers over a portion of the set of feature maps determined by a negative portion of the ground truth segmentation mask corresponding to the training image In another implementation, a method for segmenting a medical image of a human organ by a computer comprising at least one processor is disclosed. The method includes receiving a set of training medical images labeled with a corresponding set of binary ground truth segmentation masks for the human organ, establishing a fully convolutional neural network comprising a multi-layer contraction convolutional neural network and an expansion convolutional neural network connected in tandem. The method further includes iteratively training the full convolution neural network in an end-to-end manner using the set of training medical images and the corresponding set of binary ground truth segmentation masks by forward-propagating a training medical image from the set of training images through the fully convolutional neural network to generate a predictive binary segmentation mask for the training medical image, generating an end loss based on a difference between the predictive binary segmentation mask and a binary ground truth segmentation mask corresponding to the training medical image, generating an intermediate loss at one of multiple intermediate layers of the multi-layer contraction convolutional neural network based on an intermediate binary ground truth segmentation mask downsized from the binary ground truth segmentation mask corresponding to the training medical image, back-propagating the end loss and the intermediate loss through the full convolutional neural network, and minimizing a sum of the end loss and the intermediate loss by adjusting a set of training parameters of the fully convolutional neural network using gradient descent. The method additionally includes receiving an unlabeled medical image, forward-propagating the unlabeled medical image through the fully convolutional neural network to generate an output binary segmentation mask, filtering the unlabeled medical image using the output binary segmentation mask to only retain portion of image data for the unlabeled medical image, and further processing the unlabeled medical image based on the retained portion of the image data.

DETAILED DESCRIPTION

Introduction

Figure 1:
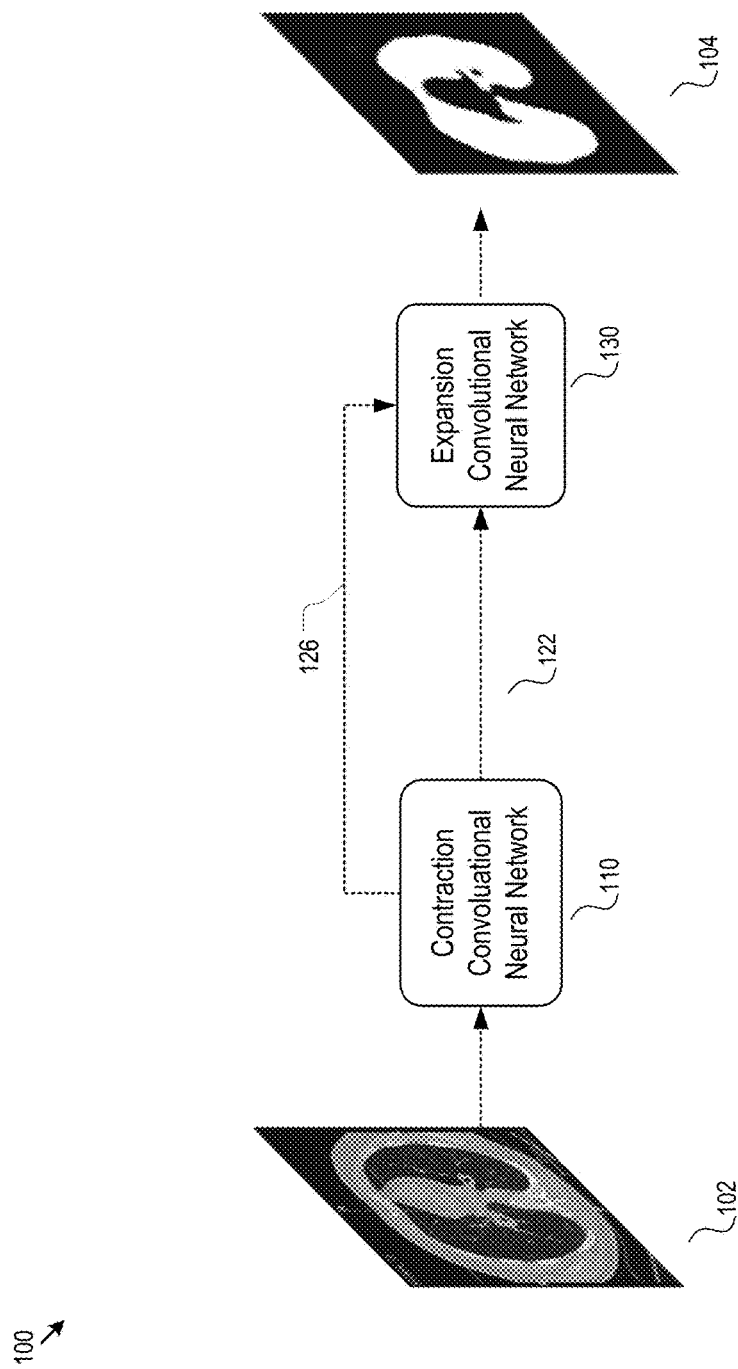
FIG. 1 illustrates a general data/logic flow of a fully convolutional neural network for implementing digital image segmentation and for generating an image segmentation mask.

A digital image may contain one or more regions of interest (ROIs). An ROI may be a particular type of object. In many applications, only image data within the ROIs contains useful information. As such, recognition of ROIs in a digital image and identification of boundaries for these ROIs using computer vision often constitute a critical first step before further image processing is performed. A digital image may contain multiple ROIs of a same type or may contain ROIs of different types. For example, a digital image may contain only human faces or may contain both human faces of and other objects of interest. Identification of ROIs in a digital image is often alternatively referred to as image segmentation. The term "digital image" may be alternatively referred to as "image".

ROIs, once determined, may be represented by a digital mask containing a same number of pixels as the digital image or down-sized number of pixels from the digital image. A digital mask may be alternatively referred as a mask or a segmentation mask.

Each pixel of the mask may contain a value used to denote whether a particular corresponding pixel of the digital image is among any ROI, and if it is, which type of ROI among multiple types of ROIs does it fall. For example, if there is only a single type of ROI, a binary mask is sufficient to represent all ROIs. In particular, each pixel of the ROI mask may be either zero or one, representing whether the pixel is or is not among the ROIs. For a mask capable of representing multiple types of ROI, each pixel may be at one of a number of values each corresponding to one type of ROIs. A multi-value mask, however, may be decomposed into a combination the more fundamental binary masks each for one type of ROI.

ROI masks are particularly useful for further processing of the digital image. For example, an ROI mask can be used as a filter to determine a subset of image data that are among particular types of ROIs and that need be further analyzed and processed. Image data outside of these particular types of ROIs may be removed from further analysis. Reducing the amount of data that need to be further processed may be advantageous in situations where processing speed is essential and memory space available is limited. As such, automatic identification of ROIs in a digital image presents a technological problem to be overcome before further processing can be done on the data which form the digital image.

ROI identification and ROI mask generation, or image segmentation may be implemented in various applications, including but not limited to face identification and recognition, object identification and recognition, satellite map processing, and general computer vision. For example, ROI identification and segmentation may be implemented in medical image processing. Such medical images may include but are not limited to Computed Tomography (CT) images, Magnetic Resonance Imaging (MRI) images, ultrasound images, X-Ray images, and the like. In Computer-Aided Diagnosis (CAD), a single or a group of images may first be analyzed and segmented into ROIs and non-ROIs. One or more ROI masks, alternatively referred to as segmentation masks, may be generated. An ROI in a medical image may be specified at various levels depending on the applications. For example, an ROI may be an entire organ. As such, a corresponding binary ROI mask may be used to mark the location of the organ tissues and the regions outside of the ROI and that are not part of the organ. For another example, an ROI may represent a lesion in an organ or tissue of one or more particular types in the organ. These different levels of ROIs may be hierarchical. For example, a lesion may be part of an organ.

In some implementations, CT images of lungs from a patient may be used in computer aided diagnosis (CAD). Lung segmentation for marking the boundary of the organ of lungs is usually the first step in a lung CT image processing and plays an important role in computer aided diagnosis of lung diseases. One key to lung segmentation is to accurately determine the boundary of the lung tissues, either normal or pathological. Because images of normal lung tissues may vary in texture and a lung with, e.g., interstitial lung disease, may additionally contain patches of distinct texture and patterns, identification of lung tissues using computer vision may be particularly challenging. Misidentifying a pathological portion of the lung tissue as not being part of the lung and masking it out from subsequent CAD analysis may lead to unacceptable false diagnostic negatives. Accordingly, the need to accurately and reliably identify a ROI in a digital image such as a medical image of a lung or other organs is important to proper medical diagnosis.

Data Flows

Segmentation of images may be performed by a computer using a model developed using deep neural network-based machine learning algorithms. For example, a segmentation model may be based on Deep Convolutional Neural Networks (DCNN). Model parameters may be trained using labeled images. The image labels in this case may contain ground truth masks, which may be produced by human experts or via other independent processes. The DCNN may contain multiple convolution layers and may optionally contain full connected layers. An exemplary embodiment involves processing digital images of lung tissues for computer aided diagnosis. During the training process, the model learns various features and patterns of lung tissues using the labeled images. These features and patterns include both global and local features and patterns, as represented by various convolution layers of the DCNN. The knowledge obtained during the training process are embodied in the set of model parameters representing the trained DCNN model. As such, a trained DCNN model may process an input digital image with unknown mask and output a predicted segmentation mask.

An exemplary DCNN model for predicting a segmentation mask for an input digital image is shown as DCNN model 100 in FIG. 1. As shown in FIG. 1, the DCNN model 100 may include at least a contraction convolutional neural network (contraction CNN) 110 and may optionally include an expansion convolutional neural network (expansion CNN) 130. The CNN 110 is contracting because it processes an input image 102 into feature maps that progressively reduce their resolutions through one or more layers of the CNN 110. As such, the term "contraction CNN" may be alternatively referred to as "down-sampling CNN". The DCNN model 100 may further include the expansion CNN 130. Feature maps at different convolution layer and with different level of resolution from the contraction CNN may be input into the expansion CNN as shown by the arrows 122 and 126. The expansion CNN 130 processes these feature maps in one or more layers and in an opposite direction to that of the contraction CNN and eventually generates a segmentation mask 104 with a resolution similar or equal to the input image 102. As such, the term "expansion CNN" may be alternatively referred to as "up-sampling CNN".

The model parameters for the DCNN include features or kernels used in various CNN layers for generating the feature maps, their weight and bias, and other parameters. By training the DCNN model using images labeled with ground truth segmentation masks, a set of features and other parameters may be learned such that patterns and textures in an input image with unknown label may be identified. In many circumstances, such as lung image segmentation, this learning process may be challenging due to lack of a large number of samples of certain important texture or patterns in training images relative to other texture or patterns. For example, in a lung image, disease image patches are usually much fewer than other normal image patches and yet it is extremely critical that these disease image patches are correctly identified by the DCNN model and segmented as part of the lung. The large number of parameters in a typical multilayer CNN tend to over-fit the network even after data augmentation. As such, the model parameters and the training process are preferably designed to reduce overfitting and promote identification of features that are critical but scarce in the labeled training images.

Figure 2:
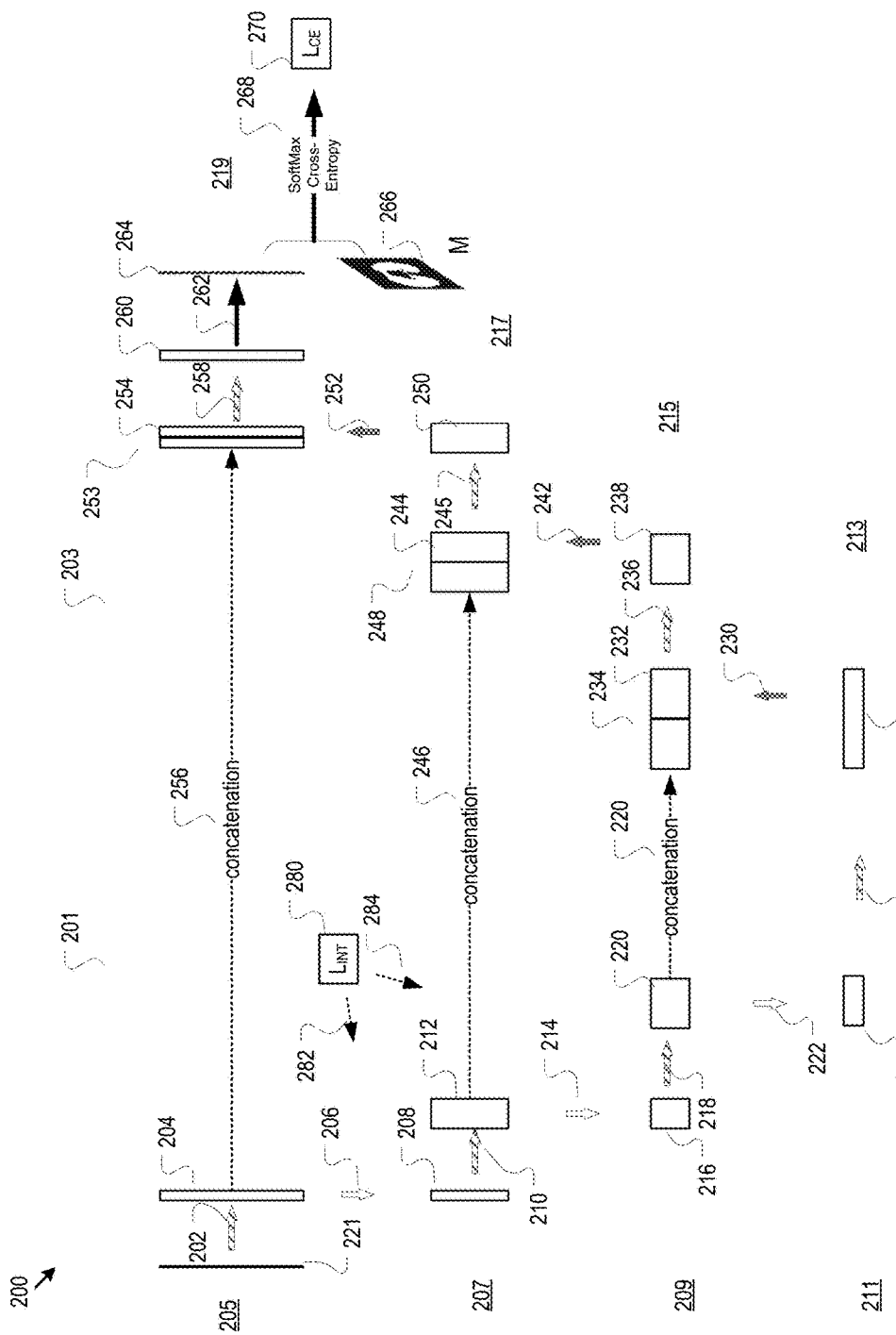
FIG. 2 illustrates an exemplary implementation and data/logic flows of the fully convolutional neural network of FIG. 1.

FIG. 2 illustrates an exemplary implementation of a DCNN 200, including a contraction CNN 201 and expansion CNN 203. Compared to a traditional DCNN for image segmentation, the implementation includes an architecture that facilitates a reduction of number of convolution layers and number of model parameters that need to be trained. In particular and for example, the contraction CNN includes four CNN layers 205, 207, 209, and 211. The input of each layer, 221, 208, 216, 224 may be convolved with a set of features (or kernels) each sliding through the input to generate stacks of feature maps 204, 212, 220, and 228 at each corresponding layer 205, 207, 209, and 211, as shown by striped arrows 202, 210, 218, and 226, respectively. Input 221 for the top layer 205 is the input image. Number of features at each convolution layer may be predetermined. For example, in the particular implementation of FIG. 2, the number of features for layers 205, 207, 209, and 211, as represented respectively by the number of feature maps or the depth of feature map stacks 204, 212, 220, and 228, may be numbers 48, 128, 256, and 512. A rectified linear unit (ReLU) may be applied for the generation of the feature map stacks 204, 212, 220, and 228 at each layer 205, 207, 209, and 211. In particular, the output of convolution between the input and features may be processed by a ReLU to generate the stacks of feature maps. The ReLUs may be of any mathematical form. For example, the ReLUs may include but are not limited to noisy ReLUs, leaky ReLUs, and exponential linear units.

After each convolution of an input with a feature in each layer, the number of pixels in a resulting feature map may be reduced. For example, a 100-pixel by 100-pixel input, after convolution with a 5-pixel by 5-pixel feature sliding through the input with a stride of 1, the resulting feature map may be of 96 pixel by 96 pixel. Further, the input image or a feature map may be, for example, zero padded around the edges to 104-pixel by 104-pixel such that to the output feature map is the 100-pixel by 100-pixel resolution.

The feature maps 204, 212, 220 may be max-pooled spatially to generate the input to a next layer below, as shown by hallow arrows 206, 214, and 222. The max-pooling may be performed using any suitable basis, e.g., 2×2, resulting in down-sampling of an input by a factor of 2 in each of the two spatial dimensions. In some implementations, spatial pooling other than max-pooling may be used. Further, different layers of 205, 207 and 209 may be pooled using a same basis or different basis, and using a same or different pooling method.

The feature map 228 of the final layer 211 of the contraction CNN 201 may be input into the expansion CNN 203 of FIG. 2 and processed upward through the expansion CNN 203. The expansion CNN 203, for example, may include layers 213, 215, 217, and 219, corresponding to layers 211, 209, 207, and 205 on the contraction CNN side, respectively. Between layers 213, 215, 217, and 219, up-conversion is performed, as shown by shaded arrows 230, 242, and 252, to up-convert features maps 228, 238, and 250 into feature maps 232, 244, and 254. The up-conversion, for example, may involve increasing the number of pixels for feature maps 228, 238, and 250 in each spatial dimension, by a factor of, e.g., 2, but reducing the number of feature maps by a factor, e.g., 2, as shown by the increase in height and decrease in thickness between the feature maps 228, 238, 250, and the corresponding up-converted feature maps 232, 244, and 254.

Within each of the layers of 215, 217, and 219, the up-converted feature maps 232, 244, and 254 may be concatenated with feature maps 220, 212, and 204 received from the contraction CNN layers to form concatenated feature maps 234, 248, and 253, respectively. In such a manner, the image information that is lost in a lower layer of FIG. 2 (towards the bottom of FIG. 2) may be replenished at a next higher layer of FIG. 2 through the concatenation process.

At each expansion layer of 215, 217, and 219, the concatenated feature map stacks 234, 248, and 253 may each be convolved with a set of features or kernels and followed by rectification (e.g., by an ReLU) to generate feature maps 238, 250, and 260. The convolution and rectification processes are shown by the striped arrows 236, 245, and 258. The convolution input at each layer may be zero padded as discussed above for the convolution process in the contraction CNN 201, such that the output feature maps would be of the same spatial size as the input. In one particular implementation, the number of features or kernels used in the convolution process 236, 245, and 258 may be numbers 256, 128, and 48, respectively.

The stack of feature maps 260 of the expansion CNN 203 may be further converted to a predicted mask 264, as shown by the solid arrow 262. For example, the arrow 262 may form a fully connected layer. For a binary mask, each pixel of the mask 264 comprises a two-dimensional vector representing the probability that the particular pixel is part of the ROI and the probability that the particular pixel is not part of the ROI. For a mask for different types of ROI, each pixel of the mask 265 would likewise comprise a multi-dimensional vector representing the probabilities that the particular pixel is part of each type of the multiple types of ROIs and the probability that the particular pixel is not part of any of the multiple types of ROIs.

In some alternative implementations, zero padding of the convolutional feature maps discussed above in one or more of the convolution processes indicated by the striped arrows 202, 210, 218, 226, 236, 245, and 258 may be omitted. In such implementations, because the convolution process reduces the spatial size of the feature maps (e.g., from 100×100 pixels to 96 by 96 pixels if the convolutional feature or kernel size is 5 by 5), the feature maps 204, 212, and 220 on the contraction side of the DCNN may contain more spatial pixels than the feature maps 254, 244, and 232 on the expansion side of the DCNN. As such, before the concatenation process, the feature maps 204, 212, and 220 may be cropped to the same spatial size (number of pixels in both spatial dimensions) as the feature maps 254, 244, and 232, respectively.

Once the DCNN 200 described above is trained, an input image 221 may then be processed through the contraction CNN 201 and expansion CNN 203 to generate a predicted segmentation mask 264. The predicted segmentation mask 264 may be used as a filter for subsequent processing of the input image 221.

The training process for the DCNN 200 may involve forward-propagating each of a set of training images 221 through the contraction CNN 201 and the expansion CNN 203. The set of training images 221 are each associated with a label, e.g., a ground truth mask 266. The training parameters, such as all the convolutional features or kernels, various weights, and bias may be, e.g., randomly initialized. The output segmentation mask 264 as a result of the forward-propagation may be compared with the ground truth mask 266 of the input image. A loss function 270 may be determined. In one implementation, the loss function 270 may include a soft max cross-entropy loss. Other types of loss function are also contemplated. Then a back-propagation through the expansion portion CNN 203 and then the contraction CNN 201 may be performed based on, e.g., stochastic gradient descent, and aimed at minimizing the loss function 270. By iterating the forward-propagation and back-propagation for the same input images, and for the entire training image set, the training parameters may converge to provide acceptable errors between the predicted masks and ground truth masks for all or most of the input images. The converged training parameters, including but not limited to the convolutional features/kernels and various weights and bias, may form a final predictive model that may be further verified using test images and used to predict segmentation masks for images that the network has never seen before. The model is preferably trained to promote errors on the over-inclusive side to reduce or prevent false negatives in later stage of CAD based on a predicted mask.

The DCNN 200 of FIG. 2 above may be further enhanced by including one or more intermediate loss functions into the training iterations and propagations, as shown by 280 and arrows 282 and 284. Such a scheme facilitates direct monitoring of errors of features at selected intermediate levels during the training process, in addition to indirectly back-propagating errors at the final stage of the network to the intermediate levels. In particular, textural characteristic of an ROI maybe be receptive fields for pixels in the intermediate layers of the DCNN. Applying intermediate loss during the stochastic gradient descent back-propagation process enables each iteration to update the most input-related features or kernels, in order to enhance the diversity of features or kernels. Because the training of features or kernels becomes more targeted, diverse, relevant, and less redundant by adding intermediate loss, the number of features or kernels needed to train an accurate predictive model may be greatly reduced, leading to fewer numbers of training parameters, less memory requirement, quicker convergence, and an overall faster training process. Further, because of the reduction of the number of DCNN model parameters, the generation of a predicted segmentation mask for an input image through the forward-propagation likewise may also be accelerated, facilitating applications requiring real-time and/or high-volume image segmentation, such as segmentation of CT scans for lungs.

During the training process, the one or more intermediate loss functions may be calculated and minimized during back-propagation in the iterative training process in any one or more intermediate stages of the DCNN in addition to the loss function 266 at the output of the DCNN. In particular, the intermediate loss functions may be applied to the one or more of the contraction CNN layers 205, 207, 209, and 211, as indicated by arrows 282 and 284. Features or kernels at these layers are direct representatives of texture and patterns in the image at various levels of complexity.

Figure 3:
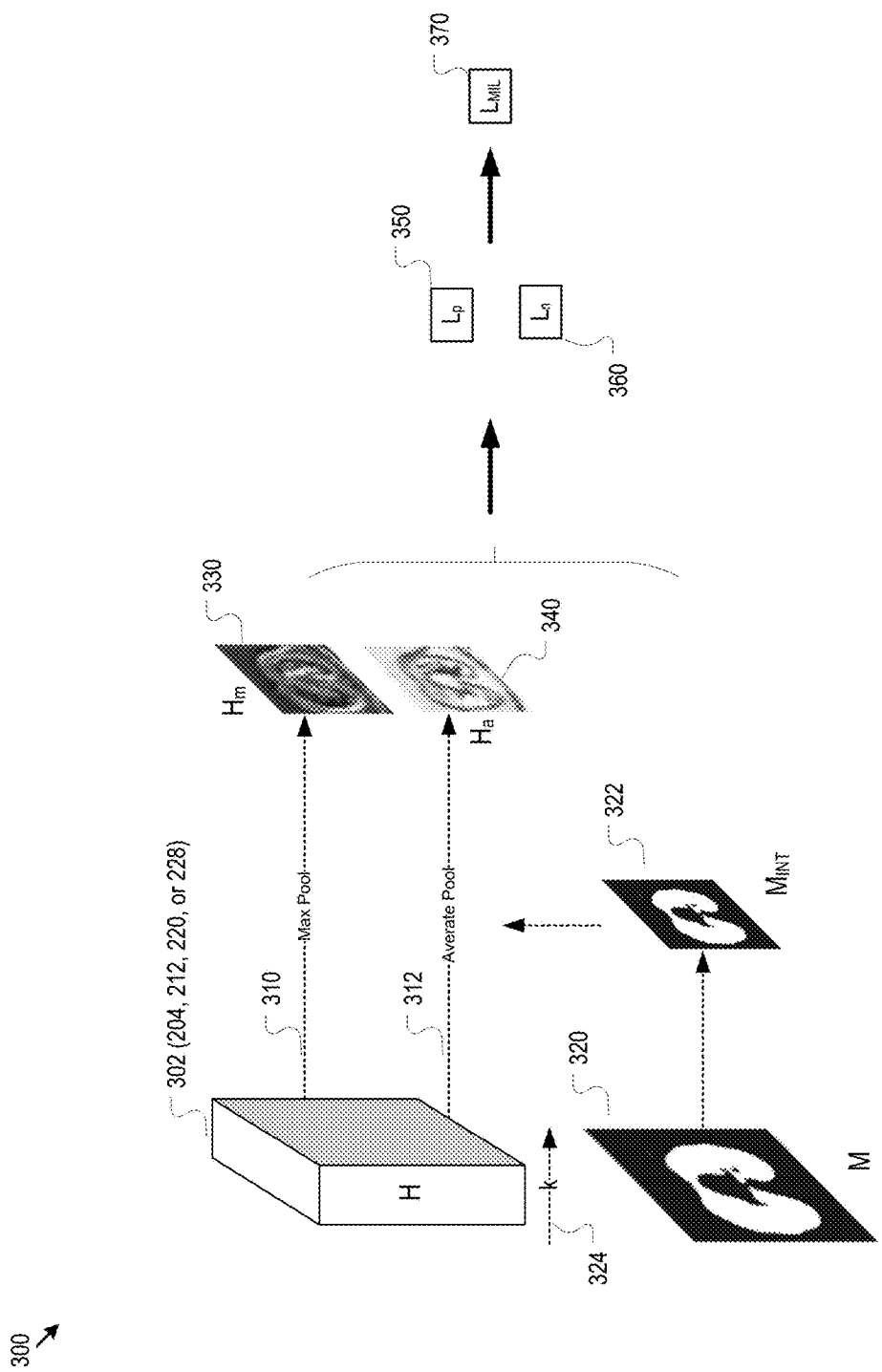
FIG. 3 illustrates an implementation for introducing a multi-instance loss in an intermediate convolution layer in FIG. 2.

In one implementation, as shown by 300 in FIG. 3, the one or more intermediate loss may be based on multi-instance learning and the intermediate loss may be referred to as multi-instance loss (MIL). Multi-instance learning classifies bags (a collection of instances that are collectively labeled) instead of individual instances. Each bag has multiple instances, but only bag-level label could be given. In one implementation, if at least one instance in the bag is positive then the bag is positive, otherwise if and only if all instances in the bag are negative then the bag is negative. In particular, an intermediate stage in the DCNN of FIG. 2 (e.g., one of the contraction CNN layers) may be regarded as a multi-instance problem. A feature map stack H (302 of FIG. 3) of an intermediate layer (e.g., 204, 212, 220, or 228 of FIG. 2) may be regarded as containing a number of instances equal to the number of maps in the stack, K. For one spatial location (i, j) in the feature map $H \in R^{I \times J \times K}$, a bag $H_{i,j} \in R^K$ may be defined. The bag contains K instances. Each instance $H_{i,j,k}$ represents the activation score from the kth feature or kernel at spatial location (i, j). If one kernel gives a positive activation at location (i, j), then the pixel at (i, j) is positive.

In one implementation, the multi-instance loss may be computed as two parts, as shown by arrows 310 and 312 of FIG. 3. In particular, intermediate ground truth mask 322 $M_{INT} \in R^{I \times J}$ may be generated from the ground truth M of the input image (320), by e.g., down-sampling or other downsizing processes. In the case that the mask is binary, $M_{INT}$ may be specified as positive one (+1) for pixels that are part of the ROIs (positive pixels) and negative one (−1) for pixels falling outside of the ROIs (negative pixels). For simplicity, the subscript of $M_{INT}$ is hereafter omitted. For positive pixels (part of the ROIs) according the intermediate ground truth mask, a bag-level predictive map $H^m \in R^{I \times J}$ (330) is calculated by max pooling from feature maps H (302) along the k-axis 324 rather than any spatial axis, as shown by arrow 310. The loss function 350 for positive pixels may be calculated as:

$$L_p = \sum_{i,j,M=1} \log(1 + \exp(-M_{ij} \times H_{ij}^m))$$

For negative pixels (outside of the ROIs) according to the intermediate ground truth mask, a bag-level predictive map $H^a \in R^{I \times J}$ (340) is calculated by average pooling from feature maps H (302) along the k-axis 324. The loss function 360 for negative pixels may be calculated as:

$$L_n = \sum_{i,j,M=-1} \log(1 + \exp(-M_{ij} \times H_{ij}^a))$$

In one implementation, the multi-instance loss function $L_{MIL}$ (370) may be exemplarily specified as:

$$L_{MIL} = L_p + \lambda_1 L_{p'} + \lambda_2 \|W\|$$

where W represents weights (of convolution layers) in the neural network, and $\lambda_1$ and $\lambda_2$ are trade-off parameters that may, for example, be predetermined (e.g., both may be set as 10 or any other suitable value).

To train the whole DCNN network 200 of FIG. 2, the stochastic gradient descent back-propagation may be used to minimize the sum of i) cross-entropy loss at the final stage (270 of FIG. 2) and ii) multi-instance loss $L_{MIL}$ (370 of FIG. 3) at intermediate stages of the DCNN. In one implementation, the cross-entropy loss may be back-propagated from the end of the DCNN to an intermediate layer of the DCNN. Then at the intermediate DCNN layer, the back-propagated cross-entropy loss to this intermediate layer may be combined (e.g., summed) with the multi-instance loss calculated for this intermediate layer. The combined loss then continues to be back-propagated to the front of the DCNN. In one implementation, a single multi-instance loss may be used at any one of the intermediate stages of the DCNN. In some other implementations, multiple multi-instance losses may be minimized at any combination of stages selected from the multiple intermediate stages of the DCNN. By minimizing the loss $L_p$, the activation score $H^m$ from the features that best matches the texture pattern in the pixel's receptive field is maximized. By also minimizing $L_n$, activation score of $H^a$ from all features or kernels are minimized so that features or kernels only give positive scores for ROI patterns. As such, the training process may quickly gravitate towards relevant and critical features.

In some implementations, the two predictive maps $H^m$ and $H^a$ may be forwarded to the next convolution layer to provide more segmentation information. For example, these two maps may be included as two of the many features for the next convolution layer.

In a further implementation, the accuracy of the trained DCNN model above may further be evaluated and improved based on a conditional adversarial network. Particularly, the DCNN trained with the multi-instance loss above is generally effective and accurate for segmenting most images. For some applications, such a DCNN segmentation model may need further improvement. For example, in the case of lung CT image segmentation and for images showing severe pathologic conditions, e.g., fibro-cavernous disease or macro-nodule attached on the lung wall or severe interstitial lung disease, it may be difficult to recognize those pathologic areas as part of lung regions by the sample-specific loss function, e.g., cross-entropy loss computed as segmentation error for each individual image sample. Using a conditional adversarial network (CAN) may overcome this problem by relaying on global information over the entire data collection to help correct the lung segmentation mask on the pathologic areas. While the case of lung segmentation is taken as an example here, the underlying principle of using global information in an adversarial neural network to improve segmentation may be broadly applied to any other image segmentation applications.

Figure 4:
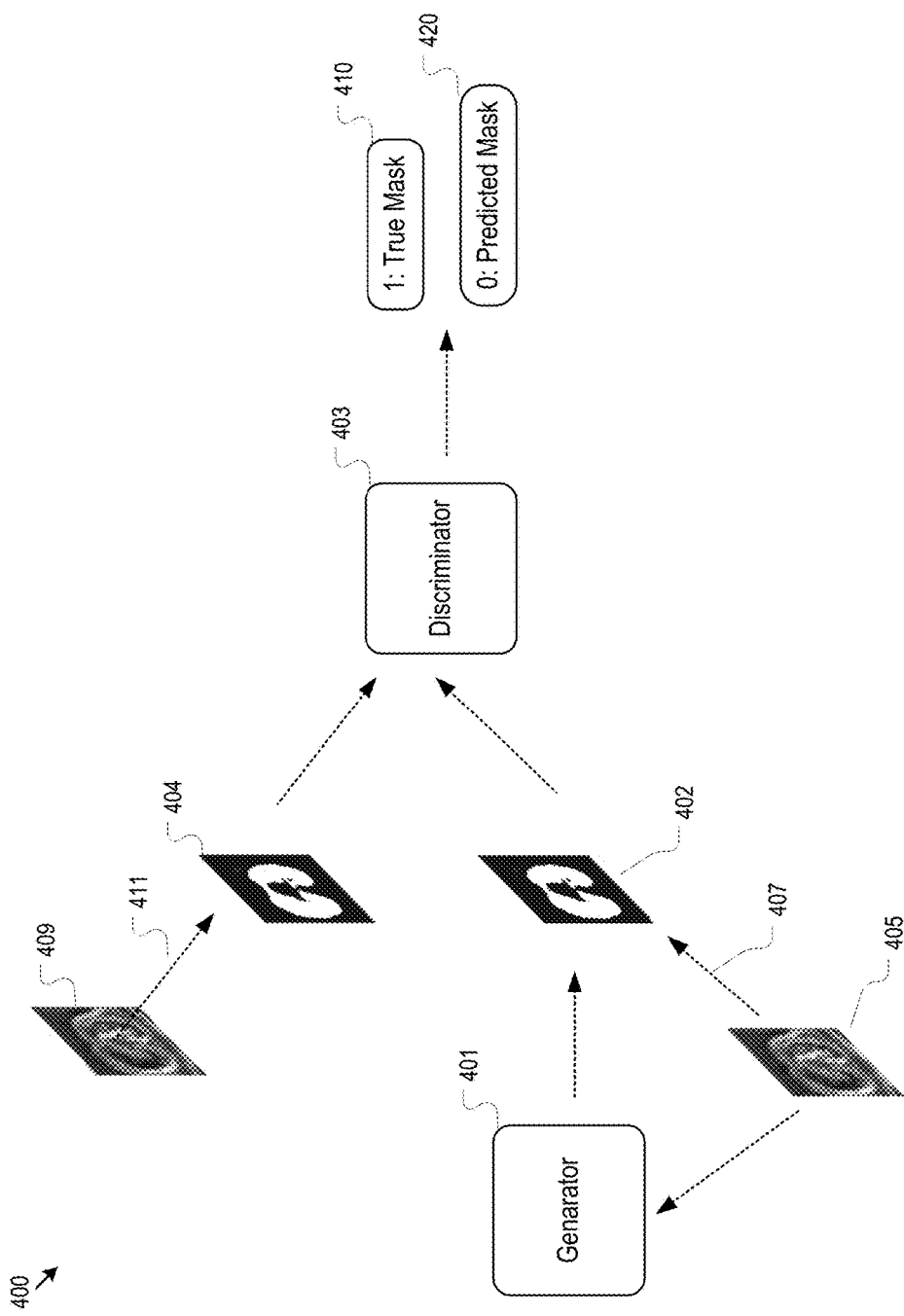
FIG. 4 illustrates an expanded fully convolutional neural network including a conditional adversarial neural network.

FIG. 4 shows an exemplary implementation of a conditional adversarial network (CAN) 400. The CAN 400 includes a generator 401 that generates prediction segmentation masks from input images. The generator 401 may be the DCNN model for image segmentation discussed above or may be one of other types of image segmentation model. The CAN 400 further includes a discriminator 403, which may be constructed as a multi-layer convolutional neural network in some implementations.

In one implementation, training data for the discriminator 403 may be segmentation masks. In particular, training segmentation masks for the discriminator 403 may include predicted segmentation masks generated by the generator 401 using input image 405. The training segmentation masks may further include ground truth masks 404. The training masks 402 may be labeled as binary 0, indicating that training segmentation masks 402 are predicted. Training segmentation mask 404 may be labeled as binary 1, indicating that the training segmentation masks 404 are ground truth masks.

In an alternative implementation, the training masks 402 and 404 may be augmented with information from the corresponding image 405, and 409, as shown by arrows 407 and 411, respectively. For example, image 405 may be combined with mask 402 to form an augmented predicted mask, and image 409 may be combined with mask 404 to form an augmented ground truth mask. Any combination of image 405 or 409 with mask 402 or 404 may be used to include image information into the masks. Similar to the implementation above, the discriminator 403 is trained to classify augmented masks into true mask 410 or predicted mask 420.

The discriminator 403 is trained to be able to correctly label masks or augmented masks 404 and 402. The trained discriminator learns the global characteristics of ground truth masks and predicted masks. The discriminator 403 thus is trained to distinguish predicted masks and ground truth masks. In some implementations, the generator 401 and discriminator 403 may be trained interactively (rather than jointly) until they reach a balance. In other words, the generator 401 trained above is further adjusted such that predicted masks by the generator 401 may trick the discriminator 403 into a wrong decision with, e.g., certain predetermined probability threshold.

Figure 5:
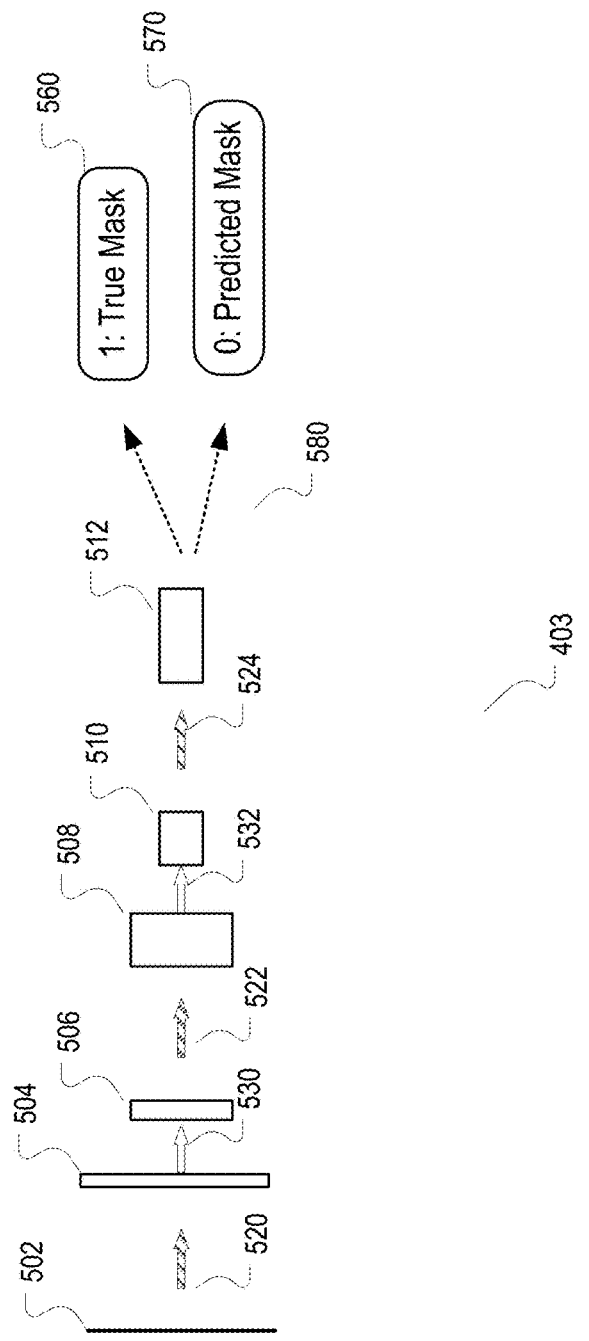
FIG. 5 shows an exemplary data/logic flow of the discriminator of FIG. 4.

FIG. 5 shows an exemplary implementation for discriminator 403 in more detail. In the implementation of FIG. 5, the discriminator 403 includes three layers of convolutional neural network followed by a full connected network. In particular, an input mask 502 (either ground truth mask or a mask predicted by the generator 401 of FIG. 4 is convolved using a first set of training features (520) to generate feature maps 504, which is max pooled spatially (530) to generate feature maps 506. The feature maps 506 are then convolved using a second set of training features (522) to obtain feature maps 508. Feature maps 508 is then max pooled (532) to generate feature maps 510. The feature maps 510 are further convolved with a third set of training features to generate feature maps 512. The feature maps 512 may be, e.g., vectorized and fully connected to the binary classification category 560 and 570. The training parameters for the discriminator may include the first, second, and third set of training features, various weights and bias in the convolutional layers and the full connected network 580.

In one implementation, generator 401 G and discriminator 403 D may be interactively trained by minmax the loss function:

$$\min_G \max_D L_{CAN} = E_{x \sim p_{data}(x)}[\log D(x)] + E_{z \sim p(z)}[\log(1 - D(G(z)))]$$

where z presents the images given to the generator as input and where x presents ground truth segmentation masks.

Training the discriminator 403 by maximizing the first term teaches the discriminator 403 to give a high score for ground truth labels. Training the discriminator 403 by maximizing the second term teaches the discriminator 403 to give a low score for predicted segmentation masks generated by 401. Training the generator 401 by minimizing the second term teaches the generator 401 to generate predicted segmentation masks to trick the discriminator 403. The discriminator may be a global classifier among all samples, as shown by FIGS. 4 and 5. As such, the generator is trained to learn a more global segmentation mask.

The training process between the generator 401 and discriminator 403 may be iterative in that the generator 401 is first trained by minimizing the end loss (and intermediate multi-instance loss, if opted, as discussed above) until its parameters converge. Then the model for the generator 401 is frozen and only the parameters of the discriminator 403 is optimized by maximizing the two terms above until its parameters converge. Next the model for the discriminator 403 is frozen and the parameters for the generator 401 is re-optimized through back-propagation by minimizing the second term above as well as the end loss (and intermediate multi-instance loss, if opted) until convergence.

The iterative training of the generator 401 and discriminator 403 stops once they are balanced. In other words, the training stops, for example when the generator can generate predicted masks that the discriminator has a reasonable probability making mistake, e.g., a probability higher than a predetermined probability threshold. The resulting generator 401 may be then used in real image segmentation applications.

Hardware Implementations

Figure 6:
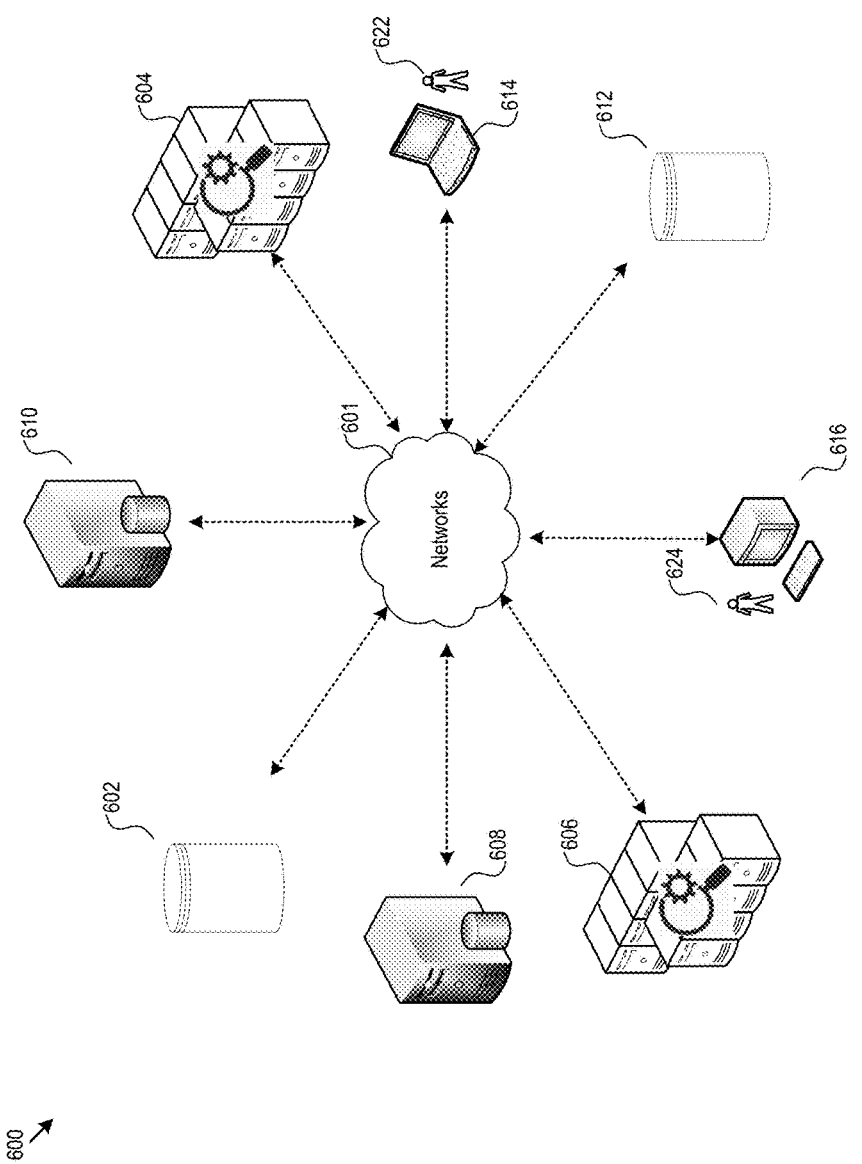
FIG. 6 shows an exemplary computer platform for segmenting digital images.

The DCNN image segmentation above may be implemented as a computer platform 600 shown in FIG. 6. The computer platform 600 may include one or more training servers 604 and 606, one or more prediction engines 608 and 610, one or more databases 612, one or more model repositories 602, and user devices 614 and 616 associated with users 622 and 624. These components of the computer platform 600 are inter-connected and in communication with one another via public or private communication networks 601.

The training servers and prediction engine 604, 606, 608, and 610 may be implemented as a central server or a plurality of servers distributed in the communication networks. The training servers 604 and 606 may be responsible for training the DCNN segmentation model discussed above. The prediction engine 608 and 610 may be responsible to analyze an input image using the DCNN segmentation model to generate a segmentation mask for the input image. While the various servers are shown in FIG. 6 as implemented as separate servers, they may be alternatively combined in a single server or single group of distributed servers combining the functionality of training and prediction. The user devices 614 and 616 may be of any form of mobile or fixed electronic devices including but not limited to desktop personal computer, laptop computers, tablets, mobile phones, personal digital assistants, and the like. The user devices 614 and 616 may be installed with a user interface for accessing the digital platform.

The one or more databases 612 of FIG. 6 may be hosted in a central database server or a plurality of distributed database servers. For example, the one or more databases 620 may be implemented as being hosted virtually in a cloud by a cloud service provider. The one or more databases 620 may organize data in any form, including but not limited to relational database containing data tables, graphic database containing nodes and relationships, and the like. The one or more databases 620 may be configured to store, for example, images and their labeled masks collected from various sources. These images and labels may be used as training data corpus for the training server 606 for generating DCNN segmentation models.

The one or more model repositories 602 may be used to store, for example, the segmentation model with its trained parameters. In some implementation, the model repository 602 may be integrated as part of the predictive engines 608 and 601.

Figure 7:
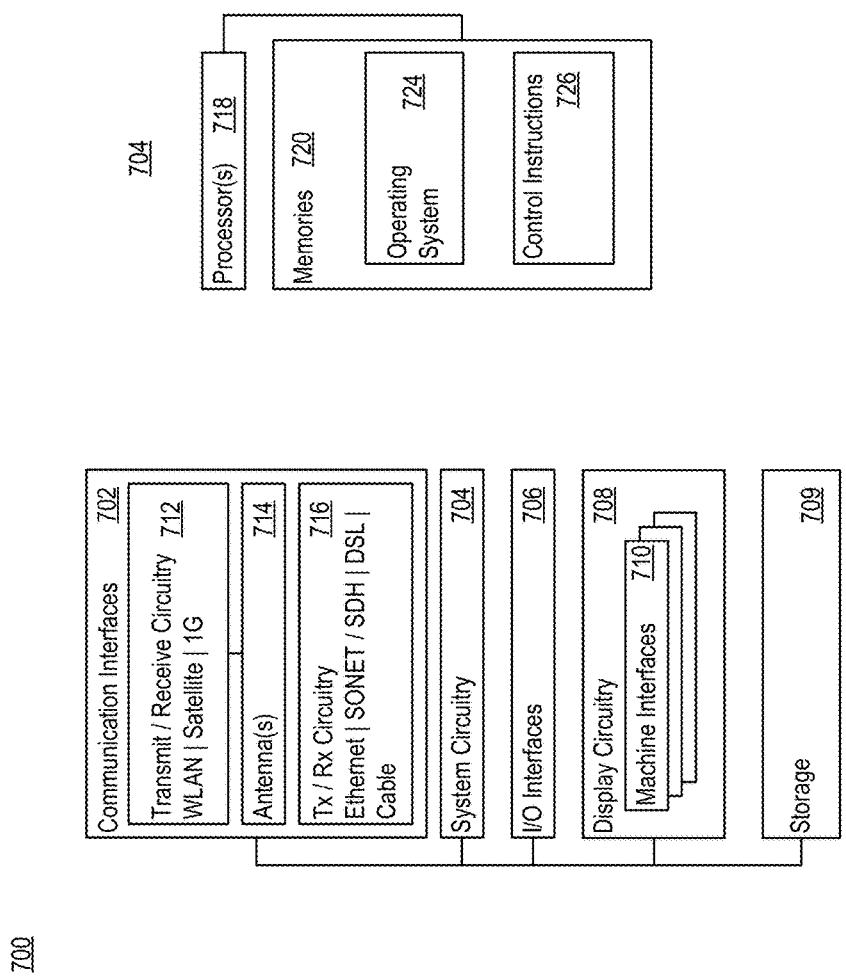
FIG. 7 illustrates a computer system that may be used to implement various computing components and functionalities of the computer platform of FIG. 6.

FIG. 7 shows an exemplary computer system 700 for implementing any of the computing components of FIG. 1. The computer system 700 may include communication interfaces 702, system circuitry 704, input/output (I/O) interfaces 706, storage 709, and display circuitry 708 that generates machine interfaces 710 locally or for remote display, e.g., in a web browser running on a local or remote machine. The machine interfaces 710 and the I/O interfaces 706 may include GUIs, touch sensitive displays, voice or facial recognition inputs, buttons, switches, speakers and other user interface elements. Additional examples of the I/O interfaces 706 include microphones, video and still image cameras, headset and microphone input/output jacks, Universal Serial Bus (USB) connectors, memory card slots, and other types of inputs. The I/O interfaces 706 may further include magnetic or optical media interfaces (e.g., a CDROM or DVD drive), serial and parallel bus interfaces, and keyboard and mouse interfaces.

The communication interfaces 702 may include wireless transmitters and receivers ("transceivers") 712 and any antennas 714 used by the transmitting and receiving circuitry of the transceivers 712. The transceivers 712 and antennas 714 may support Wi-Fi network communications, for instance, under any version of IEEE 802.11, e.g., 802.11n or 802.11ac. The communication interfaces 702 may also include wireline transceivers 716. The wireline transceivers 716 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 709 may be used to store various initial, intermediate, or final data or model needed for the implantation of the computer platform 600. The storage 709 may be separate or integrated with the one or more databases 612 of FIG. 6. The storage 709 may be centralized or distributed, and may be local or remote to the computer system 700. For example, the storage 709 may be hosted remotely by a cloud computing service provider.

The system circuitry 704 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 704 is part of the implementation of any desired functionality related to the reconfigurable computer platform 600. As just one example, the system circuitry 704 may include one or more instruction processors 718 and memories 720. The memories 720 stores, for example, control instructions 726 and an operating system 724. In one implementation, the instruction processors 718 executes the control instructions 726 and the operating system 724 to carry out any desired functionality related to the reconfigurable computer platform 600.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

From the foregoing, it can be seen that this disclosure provides a computer implemented image segmentation method and platform including a predictive model trained based on a full deep-learning convolutional neural network. The model is trained using a loss function in at least one intermediate layer in addition to a loss function at the final stage of the full convolutional neural network. In one implementation, the fully convolutional neural network is further supplemented with a conditional adversarial neural networks iteratively trained with the fully convolutional neural network as a discriminator measuring the quality of the predictive model generated by the full convolutional neural network. The predictive segmentation model trained in such a manner requires less training parameters and less memory space, and facilitates quicker and more accurate identification of relevant local and global features in the input image. Such a predictive model captures a wide range of distinct image features that are of interest to provide accurate and efficient image segmentation, and is thus a critical component in applications such as computer aided diagnosis.

What is claimed is:

1. A computer image segmentation system for digital images, comprising:
    a communication interface circuitry;
    a database;
    a predictive model repository; and
    a processing circuitry in communication with the database and the predictive model repository, the processing circuitry configured to:
        receive a set of training images labeled with a corresponding set of ground truth segmentation masks from the database;
        establish a fully convolutional neural network comprising a multi-layer contraction convolutional neural network and an expansion convolutional neural network connected in tandem;
        iteratively train the fully convolution neural network in an end-to-end manner using the set of training images and the corresponding set of ground truth segmentation masks by configuring the processing circuitry to:
            forward-propagate a training image from the set of training images through the fully convolutional neural network to generate a predictive segmentation mask for the training image;
            generate an end loss based on a difference between the predictive segmentation mask and a ground truth segmentation mask corresponding to the training image;
            generate an intermediate loss at one of multiple intermediate layers of the multi-layer contraction convolutional neural network based on an intermediate ground truth segmentation mask downsized from a ground truth segmentation mask corresponding to the training image;
            back-propagate the end loss and the intermediate loss through the fully convolutional neural network; and
            minimize a sum of the end loss and the intermediate loss by adjusting a set of training parameters of the fully convolutional neural network using gradient descent;
        store the iteratively trained fully convolutional neural network with the set of training parameters in the predictive model repository;
        receive an unlabeled input image; and
        forward-propagate the unlabeled input image through the iteratively trained convolutional neural network with the set of training parameters to generate an output segmentation mask.

2. The computer image segmentation system of claim 1, wherein at one of the intermediate layers of the multi-layer contraction convolutional neural network, the processing circuitry is configured to:
    perform convolution of a set of intermediate features sliding through an input from a preceding layer of the multi-layer contraction convolutional neural network to generate a set of feature maps;
    perform a max pooling within each map to obtain a contracted set of feature maps; and
    output the contracted set of feature maps to a next layer of the multi-layer contraction convolutional neural network.

3. The computer image segmentation system of claim 2, wherein at the one of the intermediate layers of the multi-layer contraction convolutional neural network, the processing circuitry is further configured to zero-pad each of the set of feature maps to a same size as a size of the input from the preceding layer.

4. The computer image segmentation system of claim 2, wherein the intermediate loss is generated at the one of the intermediate layers of the multi-layer contraction convolutional neural network.

5. The computer image segmentation system of claim 4, wherein:
   each of the set of ground truth segmentation masks comprises a binary mask;
   the intermediate loss comprises a first portion and a second portion;
   the first portion is derived from max pooling among the set of feature maps generated at the one of the intermediate layers over a portion of the set of feature maps determined by a positive portion of a ground truth segmentation mask corresponding to the training image; and
   the second portion is derived from average pooling among the set of feature maps generated at the one of the intermediate layers over a portion of the set of feature maps determined by a negative portion of the ground truth segmentation mask corresponding to the training image.

6. The computer image segmentation system of claim 5, wherein a feature map generated by max pooling the set of feature maps generated at the one of the intermediate layers and a feature map generated by average pooling the set of feature maps generated at the one of the intermediate layers are forwarded to a next layer of the one of the intermediate layers of the contraction convolutional neural network.

7. The computer image segmentation system of claim 1, wherein the expansion convolutional neural network comprises multiple layers corresponding to the multi-layer contraction convolutional neural network.

8. The computer image segmentation system of claim 7, wherein the expansion convolutional neural network is interconnected with the multi-layer contraction convolutional neural network at each layer by receiving feature maps from the multi-layer contraction convolutional neural network.

9. The computer image segmentation system of claim 8, wherein the feature maps received from the multi-layer contraction convolutional neural network are concatenated with corresponding feature maps in the expansion convolutional neural network.

10. The computer image segmentation system of claim 1, wherein each of the set of ground truth segmentation masks is a binary mask or a multi-value mask.

11. The computer image segmentation system of claim 1, wherein the processing circuitry is further configured to iteratively train the fully convolutional neural network based on an output of a discriminator designed for classifying the set of ground truth segmentation masks and segmentation masks predicted by the full convolutional neural network.

12. The computer image segmentation system of claim 11, wherein the discriminator comprises a multi-layer convolutional neural network.

13. The computer image segmentation system of claim 1, wherein the processing circuitry is further configured to iteratively train the fully convolutional neural network based on an output of a discriminator designed for classifying the set of ground truth segmentation masks augmented by corresponding images and segmentation masks predicted by the full convolutional neural network and augmented by images corresponding to the predicted segmentation masks.

14. The computer image segmentation system of claim 1, wherein the processing circuitry is further configured to:
   filter the unlabeled input image using the output segmentation mask to only retain portion of image data for the unlabeled input image; and
   further process the unlabeled input image based on the retained portion of the image data.

15. A method for image segmentation by a computer comprising at least one processor, the method comprising:
   receiving a set of training images labeled with a corresponding set of ground truth segmentation masks;
   establishing a fully convolutional neural network comprising a multi-layer contraction convolutional neural network and an expansion convolutional neural network connected in tandem;
   iteratively training the full convolution neural network in an end-to-end manner using the set of training images and the corresponding set of ground truth segmentation masks by:
      forward-propagating a training image from the set of training images through the fully convolutional neural network to generate a predictive segmentation mask for the training image;
      generating an end loss based on a difference between the predictive segmentation mask and a ground truth segmentation mask corresponding to the training image;
      generating an intermediate loss at one of multiple intermediate layers of the multi-layer contraction convolutional neural network based on an intermediate ground truth segmentation mask downsized from a ground truth segmentation mask corresponding to the training image;
      back-propagating the end loss and the intermediate loss through the full convolutional neural network; and
      minimizing a sum of the end loss and the intermediate loss by adjusting a set of training parameters of the fully convolutional neural network using gradient descent;
   storing the iteratively trained fully convolutional neural network with the set of training parameters in a predictive model repository;
   receiving an unlabeled input image; and
   forward-propagating the unlabeled input image through the iteratively trained convolutional neural network with the set of training parameters to generate an output segmentation mask.

16. The method of claim 15, further comprising, at one of the intermediate layers of the multi-layer contraction convolutional neural network:
   performing convolution of a set of intermediate features sliding through an input from a preceding layer of the multi-layer contraction convolutional neural network to generate a set of feature maps;
   performing a max pooling within each map to obtain a contracted set of feature maps; and
   outputting the contracted set of feature maps to a next layer of the multi-layer contraction convolutional neural network.

17. The method claim 16, further comprising, at the one of the intermediate layers of the multi-layer contraction convolutional neural network, zero padding each of the set of feature maps to a same size as a size of the input from the preceding layer.

18. The method claim 16, wherein the intermediate loss is generated at the one of the intermediate layers of the multi-layer contraction convolutional neural network.

19. The method of claim 18, wherein:
    each of the set of ground truth segmentation masks comprises a binary mask;
    the intermediate loss comprises a first portion and a second portion;
    the first portion is derived from max pooling among the set of feature maps generated at the one of the intermediate layers over a portion of the set of feature maps determined by a positive portion of a ground truth segmentation mask corresponding to the training image; and
    the second portion is derived from average pooling among the set of feature maps generated at the one of the intermediate layers over a portion of the set of feature maps determined by a negative portion of the ground truth segmentation mask corresponding to the training image.

20. A method for segmenting a medical image of a human organ by a computer comprising at least one processor, the method comprising:
    receiving a set of training medical images labeled with a corresponding set of binary ground truth segmentation masks for the human organ;
    establishing a fully convolutional neural network comprising a multi-layer contraction convolutional neural network and an expansion convolutional neural network connected in tandem;
    iteratively training the full convolution neural network in an end-to-end manner using the set of training medical images and the corresponding set of binary ground truth segmentation masks by:
        forward-propagating a training medical image from the set of training images through the fully convolutional neural network to generate a predictive binary segmentation mask for the training medical image;
        generating an end loss based on a difference between the predictive binary segmentation mask and a binary ground truth segmentation mask corresponding to the training medical image;
        generating an intermediate loss at one of multiple intermediate layers of the multi-layer contraction convolutional neural network based on an intermediate binary ground truth segmentation mask downsized from the binary ground truth segmentation mask corresponding to the training medical image;
        back-propagating the end loss and the intermediate loss through the full convolutional neural network; and
        minimizing a sum of the end loss and the intermediate loss by adjusting a set of training parameters of the fully convolutional neural network using gradient descent;
    receiving an unlabeled medical image;
    forward-propagating the unlabeled medical image through the fully convolutional neural network to generate an output binary segmentation mask;
    filtering the unlabeled medical image using the output binary segmentation mask to only retain portion of image data for the unlabeled medical image; and
    further processing the unlabeled medical image based on the retained portion of the image data.

* * * * *